United States Patent [19]
Parke

[11] Patent Number: 5,206,723
[45] Date of Patent: Apr. 27, 1993

[54] MOTION ESTIMATOR

[75] Inventor: Ian Parke, Suffolk, England

[73] Assignee: British Telecommunications public limited company, London, England

[21] Appl. No.: 778,802
[22] PCT Filed: Apr. 18, 1990
[86] PCT No.: PCT/GB90/00581
§ 371 Date: Dec. 19, 1991
§ 102(e) Date: Dec. 19, 1991
[87] PCT Pub. No.: WO90/13205
PCT Pub. Date: Nov. 1, 1990

[30] Foreign Application Priority Data

Apr. 26, 1989 [GB] United Kingdom ............... 8909498

[51] Int. Cl.$^5$ ............................................. H04N 7/137
[52] U.S. Cl. ................................................... 358/105
[58] Field of Search ......................................... 358/105

[56] References Cited

U.S. PATENT DOCUMENTS

| | | | |
|---|---|---|---|
| 4,458,266 | 7/1984 | Mahoney | 358/105 |
| 4,760,445 | 7/1988 | Mijiyawa | 358/105 |
| 4,947,248 | 8/1990 | Hienerwadel | 358/105 |
| 5,083,202 | 1/1992 | Parke | 358/105 |

FOREIGN PATENT DOCUMENTS

| | | |
|---|---|---|
| 0241983 | 10/1987 | European Pat. Off. . |
| 0309251 | 3/1989 | European Pat. Off. . |
| 82/01454 | 4/1982 | World Int. Prop. O. . |

OTHER PUBLICATIONS

IEEE/Teile Globecom Conference 87, Tokyo, Japan, Nov. 15-18, 1987, vol. 1, IEEE. T. Russell Hsing: "Motion detection and compensation coding for motion video coders: technical review and comparison"—pp. 2.5.1-2.6.4.

Proceedings of the International Conference on Acoustics, Speech, and Signal processing, Dallas, Texas, Apr. 6-9, 1987, vol. 2, IEEE A. Puri et al: "An efficient blockmatching algorithm for motion-compensated coding" pp. 25.4.1-25.4.4.

Primary Examiner—Howard W. Britton
Attorney, Agent, or Firm—Nixon & Vanderhye

[57] ABSTRACT

A motion vector for motion-compensated prediction in an inter-frame differential video coder is derived by comparing each block in a row of a current frame with the corresponding region, and positionally shifted regions, of a previous frame. The blocks are processed row by row, and scanned in a vertical column-by-column scan with each of the shifted regions. Two or more rows may be processed at a time. For ±7 pixel search, two or four comparison processors are provided, one (or one pair) processing odd-numbered blocks and the other (or other pair) processing even-numbered blocks. For a ±15 pixel search, four or eight processors are provided. The vertical scan is provided using a serial FIFO store including eight 8 tap SIPO sections.

15 Claims, 8 Drawing Sheets

MOTION ESTIMATOR

The present invention concerns motion estimation, particularly, though not exclusively, in the context of video coders employing inter-frame differential coding.

Figure 1:
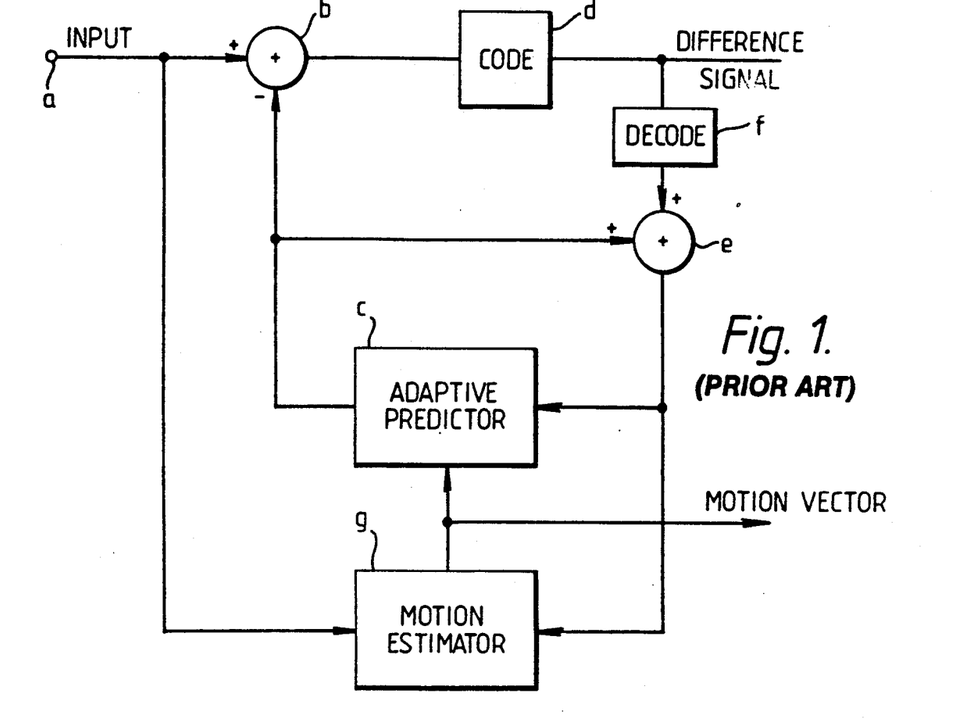
FIG. 1 shows a known form of video coder.

FIG. 1 shows a known form of video coder. Video signals (commonly in digital form) are received at an input a. A subtractor b forms the difference between the input and a predicted signal from a predictor c, which difference is then further coded in box d. The coding performed here is not material to the present invention, but may include thresholding (to suppress transmission of zero or minor differences) quantisation or transform coding, for example. The input to the predictor is the sum, formed in an adder e, of the prediction and the coded difference signal decoded in a local decoder f (so that loss of information in the coding and decoding process is included in the predictor loop).

The differential coding is essentially inter-frame, and the predictor c could simply consist of a one-frame delay; as shown, however, a motion estimator g is also included. This compares the frame of the picture being coded with the previous frame being supplied to the predictor. For each block of the current frame (into which the picture is regarded as divided), it identifies that region of the previous frame which the block most closely resembles. The vector difference in position between the identified region and the block in question is termed a motion vector (since it usually represents motion of an object within the scene depicted by the television picture) and is applied to the predictor to shift the identified region of the previous frame into the position of the relevant block in the current frame, thereby making the predictor output a better prediction. This results in the differences formed by the subtractor b being, on average, smaller, and permits the coder d to encode the picture using a lower bit rate than would otherwise be the case.

One type of motion estimator works on a block by block basis by comparing each block with the corresponding block of the previous frame and regions positionally shifted from that block position; this involves a considerable amount of processing and often necessitates many accesses to stored versions of both frames.

The present invention is defined in the claims.

Embodiments of the invention will now be described, with reference to the accompanying drawings, in which.

The motion estimator to be described regards a "current" frame of a television picture which is being coded as being divided into $8 \times 8$ blocks—that is, eight picture elements (pixels) horizontally by eight lines vertically. Although the principles are equally applicable to interlaced systems, for simplicity of description a non-interlaced picture is assumed. It is designed to generate for each block a motion vector which indicates the position of the block-sized region, lying within a defined search area of the (or a) previous frame of the picture, which is most similar to the block in question.

Figure 2:
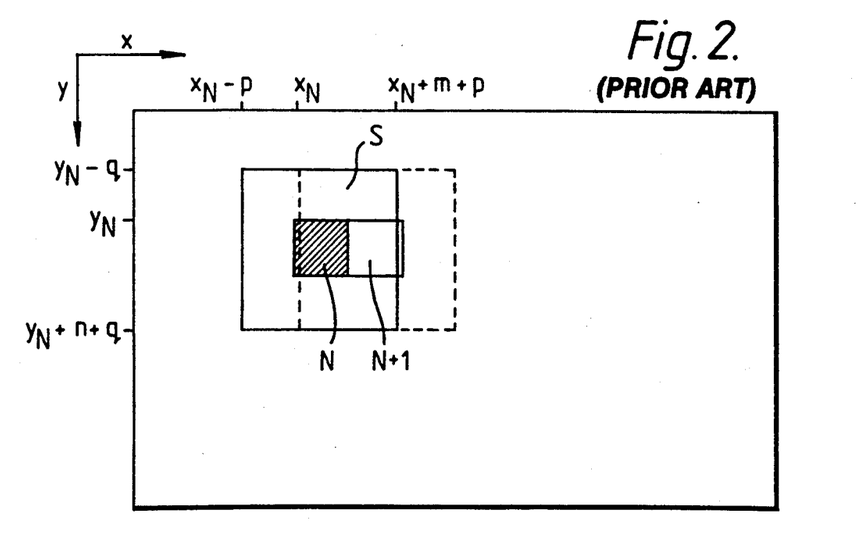
FIG. 2 shows a block of the present picture and a corresponding search area of the previous picture.

FIG. 2 illustrates a field with an $m \times n = 8 \times 8$ block N (shaded) and an associated $23 \times 23$ (i.e. $8 + 7 \times 2$) pixel search area indicated by a rectangle $S_N$. If the pixels horizontally and lines vertically are identified by coordinates x, y, with an origin at the top left-hand corner, then for a block whose upper left hand corner pixel has coordinates $x_N, y_N$ the search area is the area extending horizontally from $(x_N - 7)$ to $(x_N + 8 + 7)$ and vertically from $(y_N - 7)$ to $(y_N + 8 + 7)$, and contains corresponding $n \times m$ rectangular regions with origin co-ordinates from $(x_N - 7, y_N - 7)$ to $(x_N + 8, y_N + 8)$.

In order to obtain the motion vector, it is necessary to conduct a search in which the block is compared with each of the $(8+7) \times (8+7) = 225$ possible $8 \times 8$ regions of the previous frame lying within the search area—i.e. those whose upper left pixel has coordinates $x_N + u$, $y_N + v$ where u is the range $\pm p$ and v is in the range $\pm q$. The motion vector is the values of u,v at which the comparison indicates the greatest similarity. The test for similarity can be any conventionally used—e.g. the sum of the absolute values of the differences between each of the pixels in the "current" block and the relevant region of the previous frame.

Thus, if the current frame and previous frame pixel values are a(i,j) and b(i,j) respectively, then the sum of differences is:

$$E_{x,y}(v,u) = \sum_{i=0}^{m-1} \sum_{j=0}^{n-1} |a(x+i, y+j) - b(x+u+i, y+v+j)|$$

Commonly in the prior art, the search is carried out for each block of the current picture in turn. However because the search area associated with a block may overlap the search areas of a number of other blocks this (see the search area shown dotted in FIG. 2 for block $N+1$) often requires multiple accesses to the previous frame information stored in a frame store, which are time consuming and may interfere with other coder functions.

Figure 3:
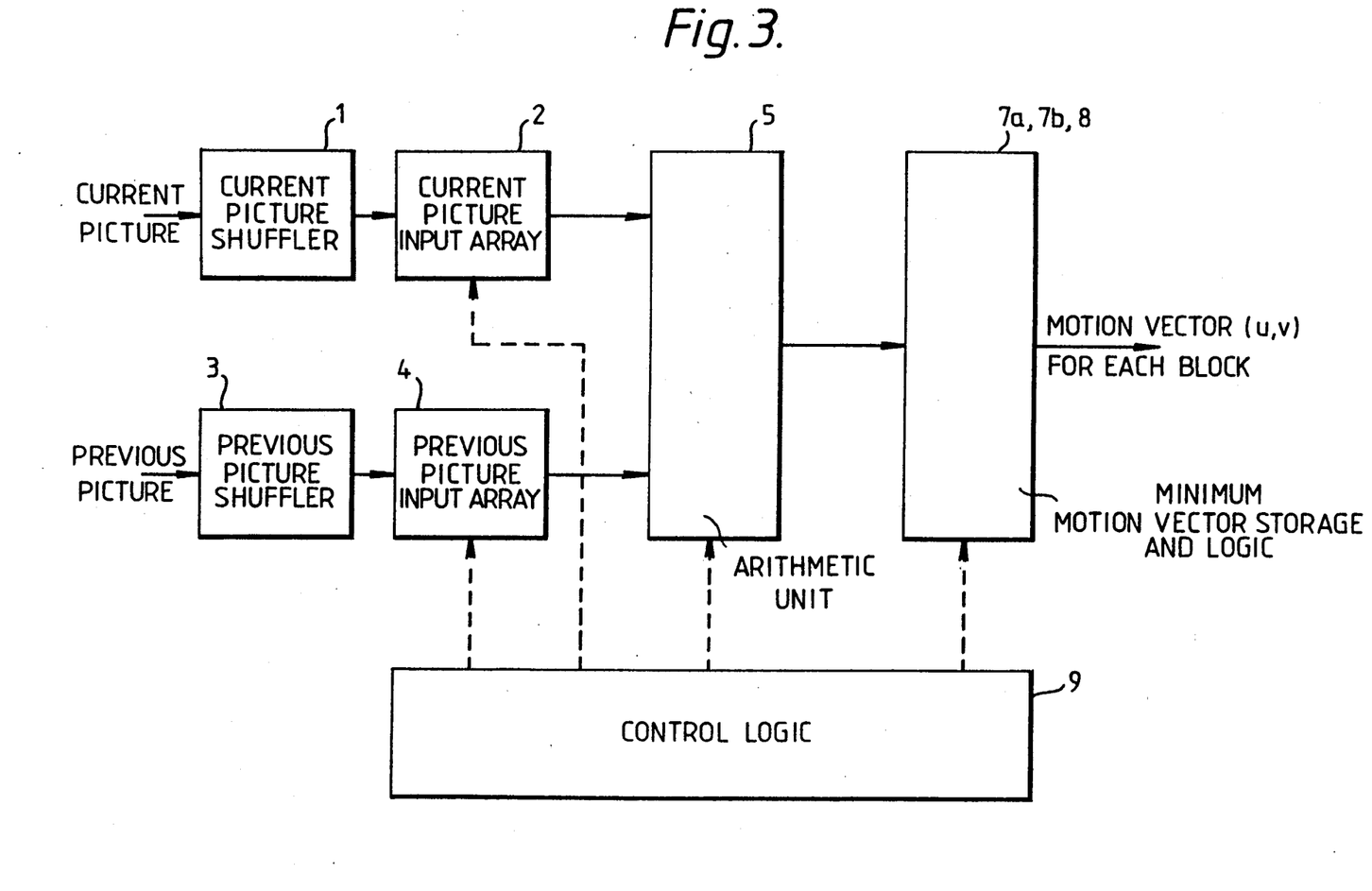
FIG. 3 shows schematically a motion vector estimator according to a first embodiment of the invention.

Referring to FIG. 3, the input pixel stream (which is in CIF or other row-scanned format) for the current frame is input into a Current Picture Shuffling Device 1 which converts it into $m \times n$ block (for example, $8 \times 8$ block) format, providing as output, one by one, successive blocks in a row-by-row format; this may be provided as a RAM buffer (operating at pixel rate). Connected to the output of the Current Picture Shuffler, a Current Picture Array 2, dimensioned to store an $m \times n$ block and latch it until the search operation for that block is complete.

The previous (usually immediately preceding) frame is stored, and is usually available in block format since it will have been encoded in this format; in one type of encoder, as $(8 \times 8)$ pixel blocks arranged into $(2 \times 2)$ macroblocks (i.e. $16 \times 16$ pixels) arranged into $11 \times 3$ Groups of Macroblocks, or GOBs (i.e. $176 \times 48$ pixels).

To estimate a motion vector, the invention compares each block of the current array with the corresponding block in the previous array, and with pixel-displaced versions of that block. To obtain such pixel-displaced versions, it is therefore necessary to convert the previous picture data out of block format into a pixel format, so that pixel-displaced versions of the block may be obtained. Since it may also be necessary to cross macroblock or GOB boundaries, then in general where such formats are employed, a 4 GOB store will be needed to effect the conversion.

In the invention, the pixel format is a column-scanned format.

To effect this conversion, a Previous Picture Shuffler 3 is provided which receives as its input the previous frame in block-by-block format and produces as output a column-by-column scanned pixel stream. This may be provided using a frame memory configured as a cylindrical RAM store, decoding GOB and block numbers into pixel and line offsets for the write address, and generating the read address using counters to give a column-by-column scan of depth D where D is the search "window" depth.

The depth D is determined by the size of the pixel blocks which are being compared in the present and past frames, and by the vertical height over which they are being searched, so that, where m is the block height, and q is the maximum vertical displacement searched, $D = m + 2q$. For an $8 \times 8$ pixel block, $m = 8$, and q may, for example, be $\pm 7$, so that in one embodiment, $D = 22$.

This output pixel stream is connected as input to a Previous Picture Storage Array 4, which at any instant contains an $m \times n$ region with which the block in the corresponding Current Picture Array 2 is to be compared.

Corresponding cells in the Current Picture Array 2 and Previous Picture Array 4 are connected to form inputs to an arithmetic unit 5 which performs a comparison operation, generating thereby a measure of similarity between the contents of the two arrays.

Arrays 2 and 4 and Arithmetic Unit 5 will henceforth be termed a 'Processor', P1.

Figure 4:
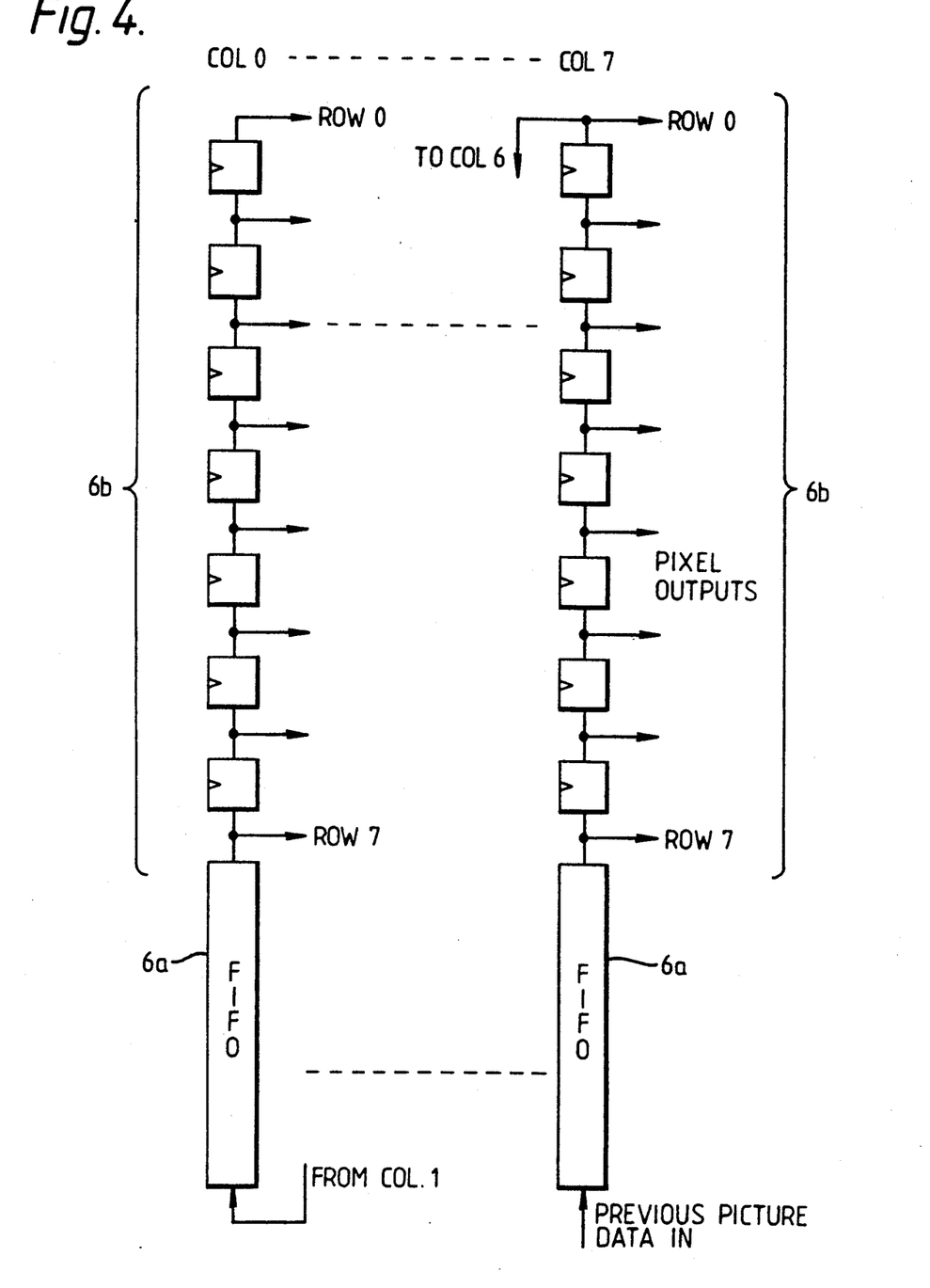
FIG. 4 shows schematically a Previous Picture Array according to one embodiment of the invention.

Referring to FIG. 4, a Previous Picture Array 4 is conveniently provided as a single, long, FIFO register comprising m (i.e. 8 for an $8 \times 8$ block) sections, each section consisting of a FIFO (first-in-first-out); section 6a of predetermined length and a SIPO serial-in-parallel-out section 6a of length $n-1$ with n taps, the sections being connected in series. The length of each section is D, the scan depth, so each FIFO section 6a is of length $D - n + 1$; for a $\pm 7$ pixel scan, and $8 \times 8$ blocks, the FIFO sections 6a are therefore 15 stages in length. As pixel data is clocked through a Previous Picture Array 4 in a column-by-column scan, the pixels appearing at each cell of each SIPO 6b of the Array comprise an $m \times n$ window which scans, column-by-column, across the corresponding block held in the Current Picture Array 2, as shown in FIG. 5.

Each block of the Current Picture must be compared with $((2p+1) \times (2q+1))$ displaced positions, where p and q are respectively the maximum horizontal and vertical search displacements. If the horizontal width p of the search area is greater than m/2, the search areas of neighbouring blocks will overlap, so after the previous picture array 2 has presented all the search positions for one block, it will have passed the first search position of the next. In the prior art, this problem is overcome by repeated access to the previous picture data. In one embodiment of the invention, the problem is sidestepped by allowing the Current Picture Array 2 of the processor P1 to latch every other block of the current picture (blocks N, N+2, N+4, ...) and providing a second processor P2, identical to the first but timed so that its current picture array 2 latches the intervening blocks (N+1, N+3, N+5, ...) (it would alternatively be possible to combine the two processors, to compare $16 \times 8$ blocks of the Current Picture, in which case the Previous Picture Array would simply comprise two arrays 2 in series). Two processors suffice for searches with $p < m$.

Figure 5:
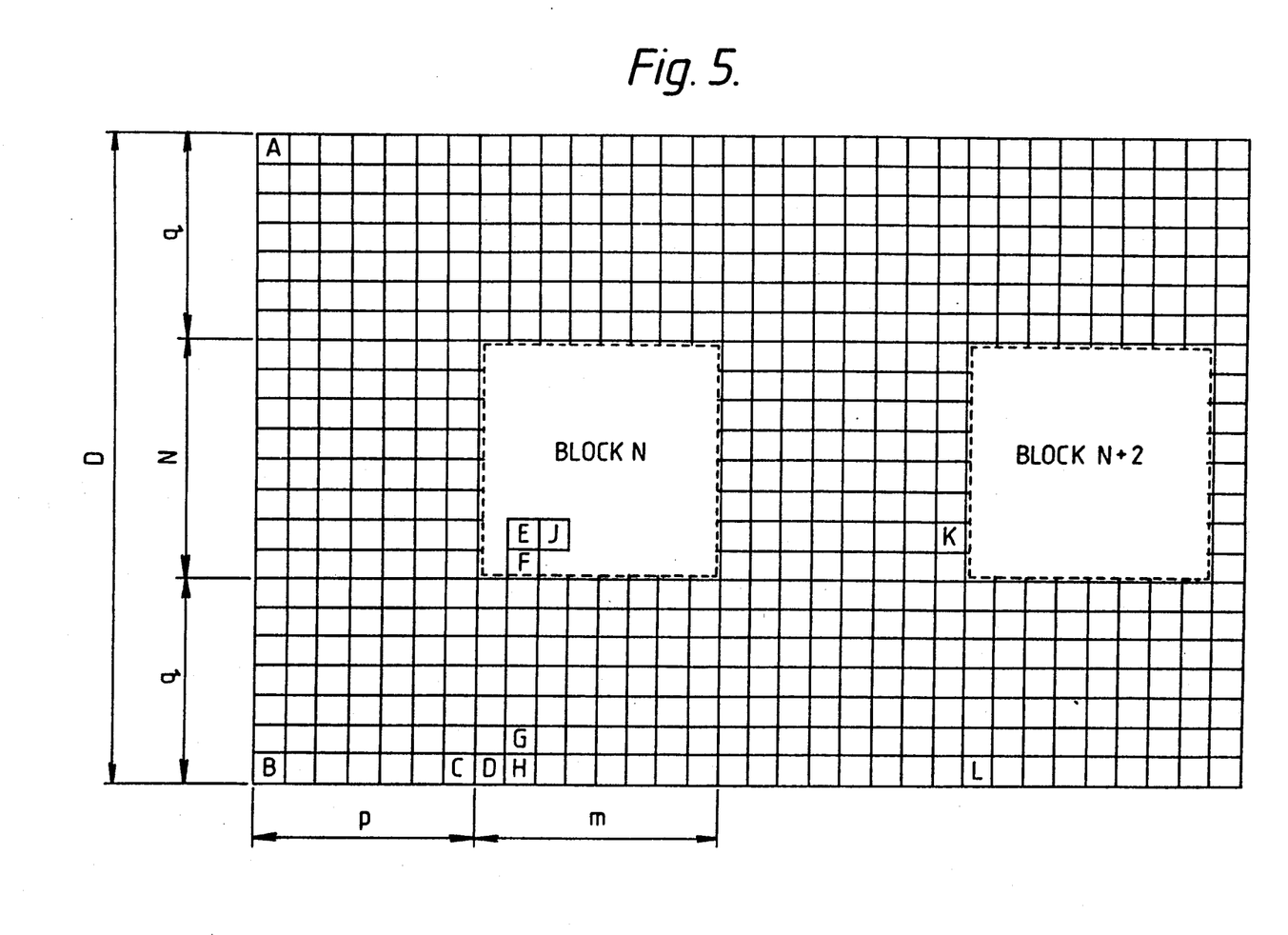
FIG. 5 shows schematically a search scan produced by the invention.

Referring to FIGS. 4 and 5, the operation of the Previous Picture Array 4 will now be described. The first pixel to be input to the Previous Picture Input Array 4 from the Previous Picture Shuffler 3 is the pixel at point A. By the time the pixel at point B is input, column C7 of the Previous Picture Input Array 4 is filled. When point C is reached, columns C1 to C7 of the Previous Picture Input Array are filled. During the period between point A and point C, the Current Picture Input Array 2 is filled with Current Picture Pixels of block N to be processed.

When point D is reached, columns C0 to C7 of the Previous Picture Input Array 4 are filled and the output taps of the SIPOs 6b contain the pixels for the first valid search position $(-7, -7)$ of block N.

Subsequent pixels that are input from point D to point E correspond to search positions $(-7, -6), (-7, -5) \ldots (-7, +7)$. Pixels from point F to point G contain no valid terms for search positions. Pixels from point H to point J correspond to search position $(-6, -7)$, $(-6, -6) \ldots (-6, +7)$ and the whole process continues until point K when all search positions for block N have been covered, i.e. $\pm 7, \pm 7$. Positions between K and L contain no valid search terms for a $\pm 7$ search.

Previous Picture Pixels continue to be input to the Previous Picture Input Array 4 of the processor, when at point L the first search position for block N+2 is encountered; at this point, block N+2 is loaded into the current picture array 2.

Since the Current Picture Array block is latched for $2 \times 8 \times 8$ pixel clock periods only, this embodiment requires (in the worst case) that the processor make 2 comparisons per pixel clock period and hence, that the Previous Picture Array 4 and the Previous Picture Shuffler 3 clock pixel data through at twice the current input pixel rate, although in general some extra (block overhead) clock periods will also be available.

For larger searches, the number of processors needed in this embodiment is 2 p/m so that a $\pm 15$ search for $8 \times 8$ blocks requires 4 processors P1–P4, each timed to latch every 4th block in the row.

If the vertical search distance q exceeds n/2, then, similarly, the search areas of successive rows of blocks will overlap, and previous frame data will therefore need to be accessed twice (at least) and pass twice (at least) through each processor.

Figure 6:
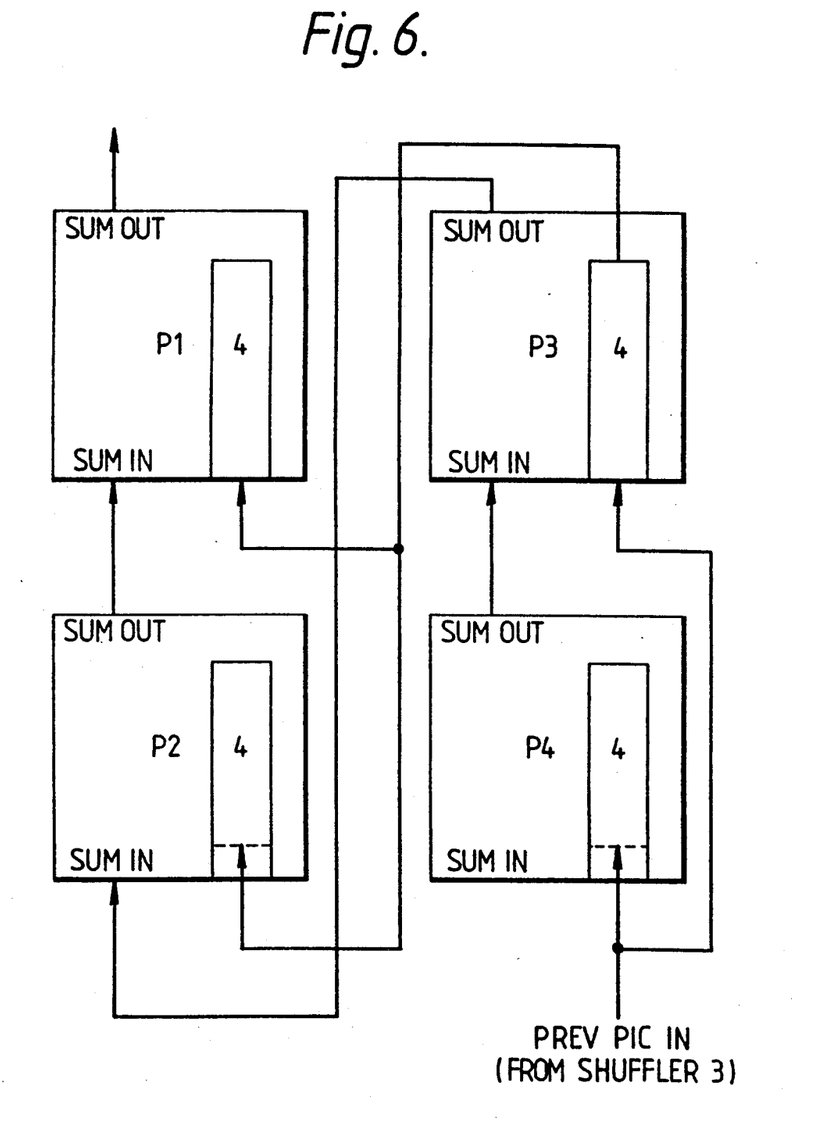
FIG. 6 shows a second embodiment of the invention.
Figure 7:
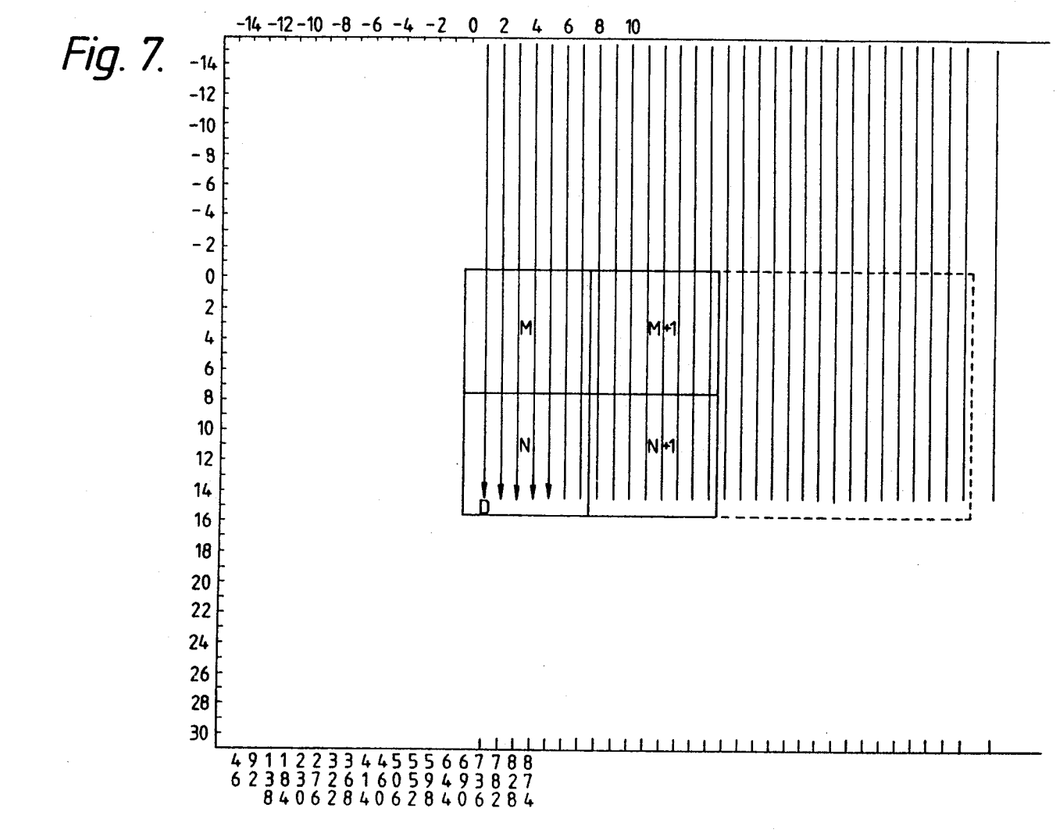
FIG. 7 shows schematically the blocks of the present picture processed by the embodiment of FIG. 6.

To avoid this, referring to FIGS. 6 and 7, in a second embodiment of the invention, two rows of blocks are processed at the same time by doubling the number of processors, providing a further two processors P3 and P4 as shown in FIG. 6. In this case, however, the first FIFO section 6a of processors P4 and P2 are n (e.g. 8) taps shorter than the other FIFO such sections, so that the blocks of pixels within the SIPO sections of P4 and P2 are at any given instant those in the row below the blocks within the SIPO sections of P1 and P3, as shown in FIG. 7. Where two rows of blocks are processed together, the scan depth D needed is $(2p + 2m)$, since the search window is scanned over *two* current blocks, so the length of the FIFO+SIPO sections, for a ±15 search of two rows of 8 ×8 blocks, is 2q+2n=46, and the length of the FIFO is 2q+n=38. Similarly, the Current Picture Arrays 2 of P1 and P3 are arranged (for example, by providing an 8-line delay) to receive blocks from the row above those received by processors P2 and P4.

It will be apparent that this embodiment is functionally equivalent to performing a comparison on 2n×2m (e.g. 16×16) blocks, and it may be convenient to cumulate the similarity measures from the 4 processors to provide a 16×16 block output, for example by providing an additional input to each arithmetic unit, linked to the output of another, as shown in FIG. 6, and taking the 4-block output from the last processor P1.

This enables selection of different block formats, and is hence of value in providing a general-purpose motion vector integrated circuit.

Using this second embodiment, a p=m/2 (±7) search requires only a single pass of the previous picture data through the processors, and the processors can run at pixel clock rate (typically, 6.75 MHz).

In either embodiment, larger search areas are possible if more processors are used; for example, a search up to ±15 pixels requires twice as many processors.

The preferred form of these embodiments of the invention utilise FIFO sections of controllably variable length, so that the scan depth D can be varied (up to a maximum length). Particularly preferred are FIFO sections switchable up to 2q+n stages in length. It is therefore possible to configure a given processor for either a ±7 search or a ±15 search by varying the FIFO length.

For the first embodiment, the further pair of processors P3, P4 are identical to P1, P2, each Current Picture Array is arranged to latch every 4th block of Current Picture data and the FIFO section of each Previous Picture Array are 15 cells long.

For the second embodiment, for a ±15 search, 8 processors P1-P8 are needed, the FIFO sections of the Previous Picture Arrays are 38 cells long, except for the first sections of P2, P4, P6 and P8 which are 8 cells shorter, and they are connected serially together in order P8, P7, P6, . . . P1. The Current Picture Arrays P2, P4, P6 and P8 are connected to latch every 4th block of one row and P1, P3, P5 and P7 are connected (e.g. via an 8-line delay) to latch every 4th block of the row below.

Similarly, larger horizontal search areas can be realised by using further processors (and larger vertical areas by increasing the FIFO length and the number of processors); preferably, all are identical so as to simplify VLSI fabrication, but certain of the elements within the processors (for example, the previous picture arrays 4) may, if desired, be common to two or more of the processors.

Figure 8:
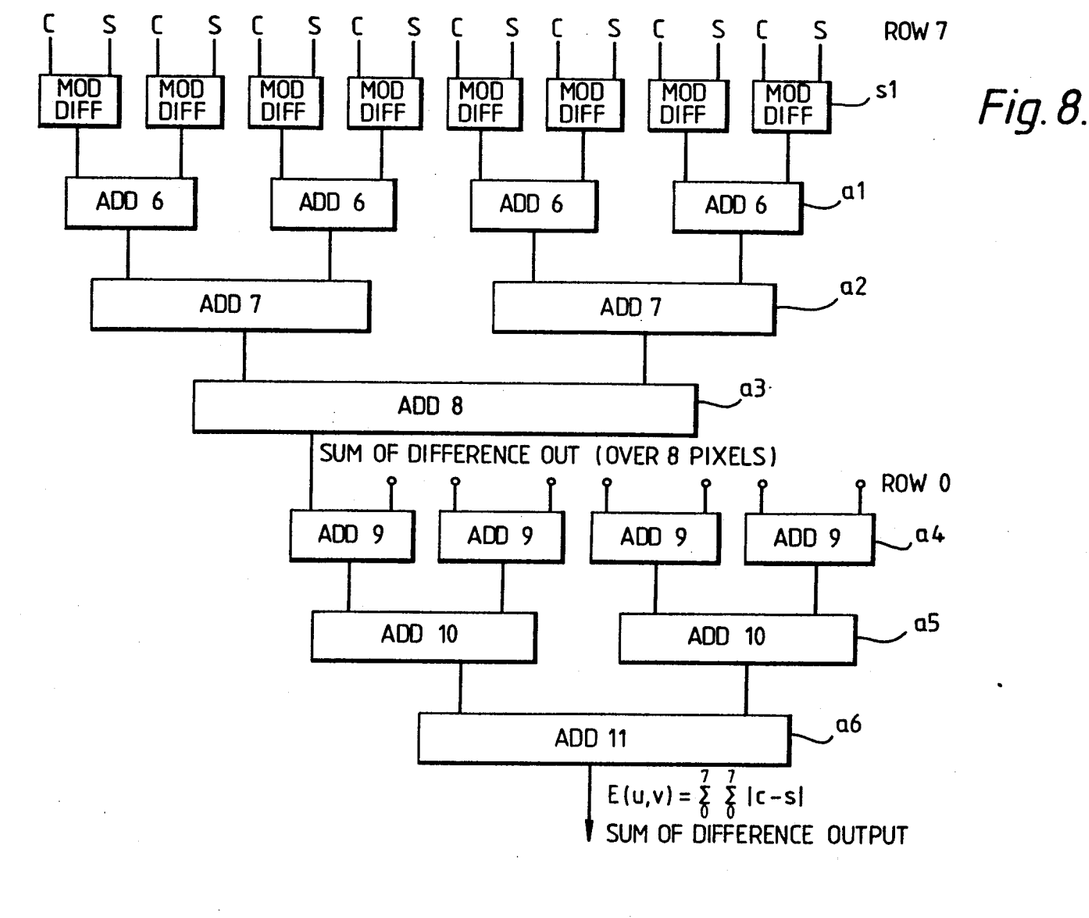
FIG. 8 shows schematically an arithmetic unit, suitable for calculating a similarity measure as part of the invention.

The measure of similarity calculated by the arithmetic unit is conveniently the Sum of Absolute Differences (SOAD) between pixels of the Previous and Current Picture Arrays, as disclosed in our previous European published application No. 309251 (incorporated herein by reference). A schematic of hardware suitable for VLSI realisation of this function is shown in FIG. 8 in which, as shown, an array of m×n subtractors are each connected to one cell of the picture array 4 and of the Current Picture Array 2, and form the absolute, or modulus, difference between the cell contents. Successive cascaded binary adders a1-a6 then accumulate all m×n differences to form E, the sum of Absolute Differences for the block.

Figure 9:
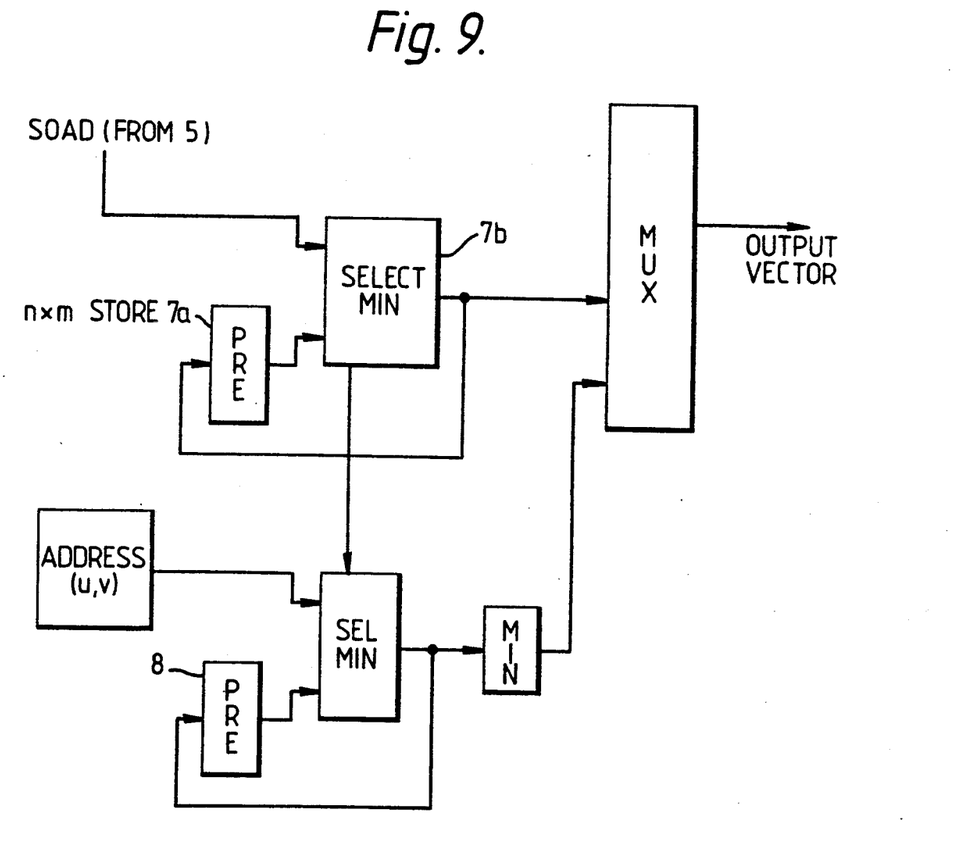
FIG. 9 shows schematically a minimum similarity measure store suitable as part of the invention.

Referring to FIG. 9, since blocks are sequentially processed, vectors can be sequentially output and no storage of intermediate results is needed, but associated with each processor is a store 7a for the lowest SOAD calculated, and a comparator 7b for comparing each new SOAD calculated with the stored value and, if the new value is lower, updating the store; a corresponding store 8 for the u and v values defining the search position at which this minimum SOAD occurred is also provided and updated, and when the search for a given block is complete, these stored u and v values form the output motion vector.

Preferably, also, the zero displacement (i.e. u,v=0) SOAD is stored.

It may be desired to give a bias to the zero vector—i.e. a non-zero vector is output only if a region u,v gives a sum of differences E(u,v) which is less by a predetermined amount than the value E (0,0) for the undisplaced region of the previous frame—e.g. is less than 75% of E(0,0). This can be achieved by a scaling unit which normally passes the values received from the processor P1 unchanged, but reduces the value to 75% of the input value for position (0,0).

In general, some control logic 9 is necessary to reset the processor after each row of blocks, and to select the search depth and latch or update the Current Picture Array 2, and also because, depending upon the size of the search, there may be a certain number of positions through which the Previous Picture Array 4 passes which fall between the search areas of successive blocks and contain no valid search terms; the control logic "masks" these to prevent the processor from attempting to compare them with the current block.

One advantage of the present invention is that, in the second embodiment of the invention, a reasonable number of extra clock cycles may be available.

For example, in a coder using 8×8 blocks arranged in 2×2 macroblocks, typically 512 cycles are available per macroblock. A ±15 search of a row of blocks using the second embodiment will take 17,572 cycles, of the available 22,528, so there are therefore 4,956 spare cycles per row.

In a colour video signal, this is sufficient time to process also the chrominance blocks U and V corresponding to a given luminance block, either because such data is usually subsampled or by using a smaller (±7) search window which will require only 4,180 cycles.

More processing could, of course, be used if the clock rate of the processors were accelerated over the input pixel rate.

The advantage of being able to do motion estimation on both luminance and chrominance blocks is that the array processor can be modified to provide the displaced previous picture region (u,v) as well as the displacement vector, or even the prediction error block formed by subtracting the present block from the displaced block. The height of the vertical columns in the previous picture input array would have to be increased to compensate for the delay in the arithmetic unit and the motion vector generator. There would then be a further block register array whose input is preferably the displaced region from the previous picture input array (but could be the error block if the processor included appropriate subtraction means) and is updated by the motion vector generator. This removes the need to have a separate shuffler external from the chip to output the displaced block for the predictor.

The description so far has conveniently ignored problems that may arise where the block under consideration is within 8 lines or pixels of the edge of the picture—i.e. certain of the regions defined by x, y, u, v overlap the line and field blanking periods. This is readily overcome by disregarding such regions. A border detector (part of control logic 9) serves to ensure that search regions which do not fall wholly within the previous frame are ignored, by masking them (as discussed above) so that the minimum SOAD is not updated for those regions.

Although the invention thus far described has operated upon blocks sequentially along a row, with a column-by-column scan, by providing different current and past picture shufflers 1 and 3, it would be possible to operate upon blocks down columns and provide a row-by-row scan, but this would increase the encoding delay and hence be undesirable.

I claim:

1. A motion detector for video signals comprising:
    means for reception and temporary storage of signals representing one line-scanned frame of a picture and of signals representing another such frame of the picture; and
    means for comparing each of a plurality of blocks into which the said one frame is divided with the corresponding region of the other frame and with a plurality of positionally shifted regions of the other frame, to produce vector information indicating the positional shift if any between the position of the block and the position of that region of the other frame which meets a criterion of similarity between the block and the region;
    said comparison means including means arranged to operate sequentially upon blocks disposed in rows aligned with the picture line direction of said one frame, and to compare each with the said plurality of positionally shifted regions of the other frame in a sequential column-by-column scan of part of said other frame.

2. A detector according to claim 1, in which the said criterion is met by a region for which a comparison value equal in the case of the unshifted region to a predetermined proportion of the said sum and equal in the case of the other regions to the said sum is less than the comparison value for all other regions compared with the block.

3. A detector according to claim 1 comprising a plurality of processors each comprising;
    (i) first picture storage means for simultaneously making available, for a period corresponding to a desired search extent in the line direction of the picture, a group of picture elements corresponding to a block of the said one frame, where successive groups within a sequence of such groups correspond to respective non-overlapping blocks; and
    (ii) second picture storage means for making simultaneously available a group of picture elements corresponding to a region of the other frame of the same size as the block, where successive groups within a sequence of such groups correspond to regions progressively shifted in a direction down in a column of the lines of the picture, and successive such sequences correspond to regions progressively shifted along the lines; and
    (iii) arithmetic means for forming the sum of the moduli or other monotonically increasing even function of the differences between the elements made available for a block and the elements made available for a region and means to ascertain for each block the vector information corresponding to the region whose sum meets the said criterion;
    in which:
    the first and second picture storage means of some of the processors are configurable, so as to process blocks in vertically neighbouring rows simultaneously, and the arithmetic means of the processors are connectable and means are provided for forming the sum of the said sums of difference function for each processor, whereby the motion detector may be configured to compare composite blocks comprising a plurality of neighbouring said blocks.

4. A detector according to claim 1, including store means for storing and outputting for a block either the region of said other frame to which it is most similar, or the block prediction error between the block and the region.

5. A detector according to claim 4 arranged to receive and process luminance and chrominance blocks of a colour picture signal.

6. A detector according to claim 1 in which the means for reception and storage comprise:
    (i) first picture storage means for simultaneously making available, for a period corresponding to a desired search extent in the line direction of the picture, a group of picture elements corresponding to a block of the said one frame, where successive groups within a sequence of such groups correspond to respective non-overlapping blocks; and
    (ii) second picture storage means for making simultaneously available a group of picture elements corresponding to a region of the other frame of the same size as the block, where successive groups within a sequence of such groups correspond to regions progressively shifted in a direction down in a column of the lines of the picture, and successive such sequences correspond to regions progressively shifted along the lines;
    said means for comparing including arithmetic means for forming the sum of the moduli or other monotonically increasing even function of the differences between the elements made available for a block and the elements made available for a region and means to ascertain for each block the vector information corresponding to the region whose sum meets the said criterion.

7. A detector according to claim 6, in which the second picture storage means comprises a FIFO array including m sections, where m is the width of a block along the line direction, each such section comprising a SIPO stage having n taps, where n is the depth of a block along a column of such lines, the SIPO stages being separated by FIFO stages, the length of each section being D, where D is the extent of the said column-by-column scan.

8. A detector according to claim 7, in which the length of the FIFO stages is $2q+1$, where $\pm q$ is the maximum vertical positional shift of the most displaced region of the other frame with which each block is to be compared.

9. A detector according to claim 7 in which the length of the FIFO stages is controllably variable.

10. A detector according to claim 7 for processing in parallel the vertically neighbouring blocks of a plurality A of horizontal rows, in which (where $\pm q$ is the maximum vertical positional shift of the most displaced region of the other frame with which each block is to be compared):

there are provided A arithmetic means;

each is connected to a first delay and storage means such that each processes blocks of a different row of said one frame;

each is connected to a second delay means which includes one FIFO stage of such a length that the regions of said other frame which each arithmetic means at a given time is comparing are vertically displaced one from another by n rows; and the lengths of the other FIFO stages of such second delay means are $2q+(A-1)n$.

11. A detector according to claim 10, in which the second delay means is arranged concurrently to make available additional sequence corresponding to regions (or blocks) shifted by successive multiples of n lines relative to the first mentioned sequence so as to correspond to regions for blocks) vertically adjacent the first sequence, and the comparing means include additional arithmetic means for processing the additional sequence(s).

12. A detector according to claim 10 in which the desired search extent in the line direction is greater than half the extent of a block in that direction, the delay and storage means is arranged concurrently to form a plurality B (where B is the lowest integer greater than $2p/m$) of different sequences containing groups of picture elements corresponding to every B-th block in the line direction, and the arithmetic means comprises a plurality B of arrangements for forming the said sums for the respective sequences.

13. A motion detector for video signals comprising:

means for reception and temporary storage of signals representing one line-scanned frame of a picture and of signals representing another such frame of the picture; and means for comparing each of a plurality of blocks into which the said one frame is divided with the corresponding region of the other frame and with a plurality of positionally shifted regions of the other frame, to produce vector information indicating the positional shift if any between the position of the block and the position of that region of the other frame which meets a criterion of similarity between the block and the region;

said comparison means including means arranged to operate sequentially upon blocks disposed in columns aligned normal to the picture line direction of said one frame, and to compare each with the said plurality of positionally shifted regions of the other frame in a sequential row-by-row scan of part of said other frame.

14. A motion detector for digital video signals comprising:

a first digital data store for storing at least a block of m columns of n rows of pixel values for a first frame of digital video signals;

a second digital data store for storing at least a block of $D-n+1$ rows of m columns of pixel values for a second frame of digital video signals, D being the scan depth of motion searching to be performed along each column;

said second digital data store including a FIFO register with m SIPO sections providing $m\times n$ pixel values corresponding to an $m\times n$ pixel window which provides $m\times n$ pixel values at successive scan positions, row-by-row along each of plural successive columns so as to effect a column-by-column motion detection search over the second frame digital video signals as pixel values therefore are serially shifted into said FIFO register; and arithmetic circuits connected to receive in parallel, said $m\times n$ pixel values from said first data store and said $m\times n$ pixel values from said SIPO sections of said second data store, and to compute a similarity value for each scan position of the second frame video signals in said second data store.

15. A motion detector as in claim 14 wherein said first frame of digital video signals represents a current video frame and said second frame of digital video signals represents a previous video frame.

* * * * *